(12) United States Patent
Takechi et al.

(10) Patent No.: US 9,700,031 B2
(45) Date of Patent: Jul. 11, 2017

(54) RECIPROCATING MECHANISM FOR A FISHING REEL AND A FISHING REEL

(71) Applicants: Shimano Inc., Sakai, Osaka (JP); Shimano Components (Malaysia) SDN/BHD, Pontian, Johor (MY)

(72) Inventors: Kunio Takechi, Osaka (JP); Akira Niitsuma, Osaka (JP); Koichi Kawane, Osaka (JP); Keigo Kitajima, Johor (MY); Baihaki Bin Sabtu, Johor (MY); Abu Supian Bin Ahmad, Johor (MY)

(73) Assignees: Shimano Inc., Osaka (JP); Shimano Components (Malaysia) SDN. BHD., Johor (MY)

( * ) Notice: Subject to any disclaimer, the term of this patent is extended or adjusted under 35 U.S.C. 154(b) by 31 days.

(21) Appl. No.: 15/057,776

(22) Filed: Mar. 1, 2016

(65) Prior Publication Data
US 2016/0262362 A1 Sep. 15, 2016

(30) Foreign Application Priority Data
Mar. 10, 2015 (JP) .................................. 2015-047323

(51) Int. Cl.
| | | |
|---|---|---|
| *A01K 89/01* | (2006.01) | |
| *A01K 89/015* | (2006.01) | |
| *F16D 7/04* | (2006.01) | |
| *F16D 43/202* | (2006.01) | |

(52) U.S. Cl.
CPC ........ *A01K 89/01143* (2015.05); *A01K 89/01* (2013.01); *A01K 89/015* (2013.01); *A01K 89/01917* (2015.05); *F16D 7/048* (2013.01); *F16D 43/2028* (2013.01)

(58) Field of Classification Search
CPC ................ A01K 89/01; A01K 89/0114; A01K 89/01142; A01K 89/01143; A01K 89/015; A01K 89/01915; A01K 89/01916; A01K 89/01917
See application file for complete search history.

(56) References Cited

U.S. PATENT DOCUMENTS

| | | | | |
|---|---|---|---|---|
| 3,544,030 A | * | 12/1970 | Daniels ................ | A01K 89/012 242/225 |
| 4,747,560 A | * | 5/1988 | Karlsson .............. | A01K 89/015 242/260 |
| 5,308,017 A | * | 5/1994 | Yoshikawa ........ | A01K 89/0114 242/241 |
| 5,503,345 A | * | 4/1996 | Kaneko ................ | A01K 89/015 242/279 |
| 5,598,983 A | * | 2/1997 | Sato ..................... | A01K 89/015 242/261 |

(Continued)

FOREIGN PATENT DOCUMENTS

| | | | |
|---|---|---|---|
| EP | 2130431 A1 * | 12/2009 | ............. A01K 89/01 |
| JP | 4-19174 U | 2/1992 | |

*Primary Examiner* — Emmanuel M Marcelo
(74) *Attorney, Agent, or Firm* — Global IP Counselors, LLP (57) ABSTRACT

A level winding mechanism for a dual-hearing reel is equipped with a worm shaft including intersecting spiral grooves and an engagement pin, and a torque limiting mechanism. The engagement pin engages the spiral grooves. The torque limiting mechanism limits the rotational drive force which rotates the worm shaft. At least a portion of the worm shaft is made of synthetic resin.

12 Claims, 9 Drawing Sheets

(56) References Cited

U.S. PATENT DOCUMENTS

| | | | | |
|---|---|---|---|---|
| 5,722,609 A * | 3/1998 | Murakami | ......... | A01K 89/0114 242/241 |
| 5,775,614 A * | 7/1998 | Yamaguchi | .......... | A01K 89/015 242/261 |
| 5,984,220 A * | 11/1999 | Kawabe | ............. | A01K 89/0114 242/241 |
| 5,996,919 A * | 12/1999 | Murayama | ........... | A01K 89/015 242/261 |
| 6,045,075 A * | 4/2000 | Iwabuchi | ............. | A01K 89/015 242/157 R |
| 6,053,444 A * | 4/2000 | Yamaguchi | .......... | A01K 89/015 242/275 |
| 2008/0066993 A1* | 3/2008 | Kaneiwa | ............. | B62D 5/0409 180/444 |
| 2015/0090819 A1* | 4/2015 | Shimizu | ................ | A01K 89/01 242/241 |

* cited by examiner

RECIPROCATING MECHANISM FOR A FISHING REEL AND A FISHING REEL

CROSS-REFERENCE TO RELATED APPLICATIONS

This application claims priority based on Japanese Patent Application No. 2015-047323, filed in Japan Patent Office on Mar. 10, 2015, the contents of which is hereby incorporated herein by reference.

BACKGROUND

Field of the Invention

The present invention relates to a reciprocating mechanism for a fishing reel comprising a worm shaft and an engagement pin, and a fishing reel equipped with the same, Background information A fishing reel, such as a dual-bearing reel or a spinning reel, includes a reciprocating mechanism having a worm shaft comprising intersecting spiral grooves, and an engagement pin that engages with the spiral grooves, in order to wind a fishing line evenly onto a spool (for example, refer to Japanese unexamined utility model application publication No. H04-19174). A conventional worm shaft is made of synthetic resin in which spiral grooves are formed by injection molding to suppress variations in the shape of the spiral grooves.

SUMMARY

It is possible to suppress variations in the shape of spiral grooves in a worm shaft by configuring the worm shaft from synthetic resin. However, due to jamming of foreign objects in the spiral grooves or an application of excessive rotational torque, there is the risk of a malfunction occurring in the reciprocating mechanism due to deformation from abrasion and wear in the spiral grooves.

The object of the present invention is to prevent an occurrence of a malfunction in the reciprocating mechanism, even when using a synthetic resin worm shaft.

The reciprocating mechanism for a fishing reel according to another aspect of the present invention comprises a worm shaft, a rotary drive mechanism, and the above-described engagement pin. The worm shaft comprises intersecting spiral grooves. The engagement pin engages with the spiral grooves. The torque limiting mechanism limits the rotational drive force which rotates the worm shaft. At least a portion of the worm shaft is made of synthetic resin.

In this reciprocating mechanism, the rotational drive force that rotates the worm shaft, at least a portion of which is made of synthetic resin, is limited by the torque limiting mechanism. Accordingly, it is possible to weaken the rotational drive force that is transmitted to the worm shaft, at least a portion of which uses synthetic resin with a rigidity that is lower than metal. Accordingly, a malfunction will not occur in the reciprocating mechanism, even when using a synthetic resin worm shaft.

The engagement pin can comprise a shaft portion, and an engagement portion that is integrally disposed on one end of the shaft portion and that engages with the spiral grooves of the worm shaft. At least the engagement portion may be made of synthetic resin. In this case, the engagement portion that engages with the spiral groove is made of synthetic resin. Accordingly, the shape of the engagement portion of the engagement pin of the reciprocating mechanism can be accurately maintained by the injection molding. Further, abrasion and wear, etc., of the spiral groove can be suppressed to a minimum.

The shaft portion and the engagement portion may be integrally formed of synthetic resin. In this embodiment, manufacturing the engagement pin is easy. Further, it is possible to increase the rotating performance of the engagement pin around the shaft, by using a synthetic resin with a high sliding performance.

The engagement pin can comprise a narrowed portion disposed between the shaft portion and the engagement portion. The narrowed portion has a smaller diameter than the shaft portion. In this embodiment, the axial position of the engagement pin, in a direction that approaches the worm shaft, can be positioned by the level difference between the shaft portion and the narrowed portion. Accordingly, it is easy to maintain a constant gap between the distal end of the engagement portion and the bottom portion of the spiral grooves.

The engagement portion thins in a direction away from one end, and can comprise, at the distal end, an engagement recess that engages the bottom portion of the spiral grooves and which is recessed in an arcuate shape. In this embodiment, it is possible to smoothly move the engagement pin while maintaining a constant gap between the engagement recess and the bottom portion.

The shaft portion may be non-circular. In this embodiment, since the cross section of the shaft portion that is perpendicular to the axial direction of the shaft portion is non-circular, a gap can be formed between the engagement pin, which is disposed in a circular hole, and the hole. Accordingly, when forming the engagement pin with a single split mold that is divided along the axial direction, by arranging the cleavage planes of the two molds in the portion where the gap is formed, even if burrs are generated, the accuracy of the engagement pin, which is disposed in the circular hole, will not be significantly affected.

The cross section of the shaft portion that is perpendicular to the axial direction of the shaft portion can comprise at least one flat portion. In this embodiment, since a flat portion is a simple shape, it is relatively easy to form a portion in the dividing portion of the mold which becomes the flat portion.

The shaft portion may comprise a first flat surface that is disposed along the axial direction. In this embodiment, since the first flat surface is an even simpler shape, it is easy to form a portion in the dividing portion of the mold which becomes the first flat surface.

The shaft portion may further comprise a second flat surface that is parallel to the first flat surface. In this embodiment, by disposing portions in the dividing portion of the mold that become the first flat surface and the second flat surface, when manufacturing an engagement pin, the engagement pin is less likely to he affected by burrs that may be generated in the dividing portion.

A fishing reel according to another aspect of the present invention comprises a reel body having a handle disposed thereon, a spool on which a fishing line can be wound by a rotation of the handle, and the above-described reciprocating mechanism for evenly winding the fishing line on to the spool.

In this fishing reel, when the worm shaft is rotated by rotation of the handle, the engagement pin that is engaged with the spiral grooves of the worm shaft is reciprocated along the axial direction of the worm shaft. The above-described action and effect are exerted, because at least a portion of the worm shaft is made of synthetic resin.

The fishing reel may be a dual-bearing reel. The reel body may comprise a first side plate and a second side plate. The spool can comprise a spool shaft that is rotatably supported by the first side plate and the second side plate, and be rotatably disposed between the first side plate and the second side plate. The worm shaft can be disposed parallel to the spool shaft and rotatably supported by the first side plate and the second side plate. The reciprocating mechanism can comprise a fishing line guide that is supported by the reel body so as to be movable in the axial direction parallel to the spool shaft, and which rotatably houses the engagement pin inside. The fishing line guide can be reciprocated in the axial direction of the spool shaft between the first side plate and the second side plate by a rotation of the worm shaft. In this embodiment, the above-described action and effects are exerted in the dual-bearing reel.

The fishing reel may be a spinning reel as well. The spinning reel can comprise a rotor that is rotated with respect to the reel body by a rotation of the handle, and that rotates around the spool to wind the fishing line onto the spool. The reciprocating mechanism can comprise a slider, to which a spool shaft is coupled so as to be axially immovable, supported by the reel body so as to be movable in the axial direction of the spool shaft, and in which an engagement pin is rotatably housed. The slider is reciprocated in the axial direction of the spool shaft by the rotation of the worm shaft. In this embodiment, the above-described action and effects are exerted in the spinning reel.

According to the present invention, malfunction in the reciprocating mechanism will not occur, even when using a synthetic resin worm shaft.

BRIEF DESCRIPTION OF THE DRAWINGS

Referring now to the attached drawings which form a part of this original disclosure.

DETAILED DESCRIPTION OF THE EMBODIMENTS

First Embodiment

Figure 9:
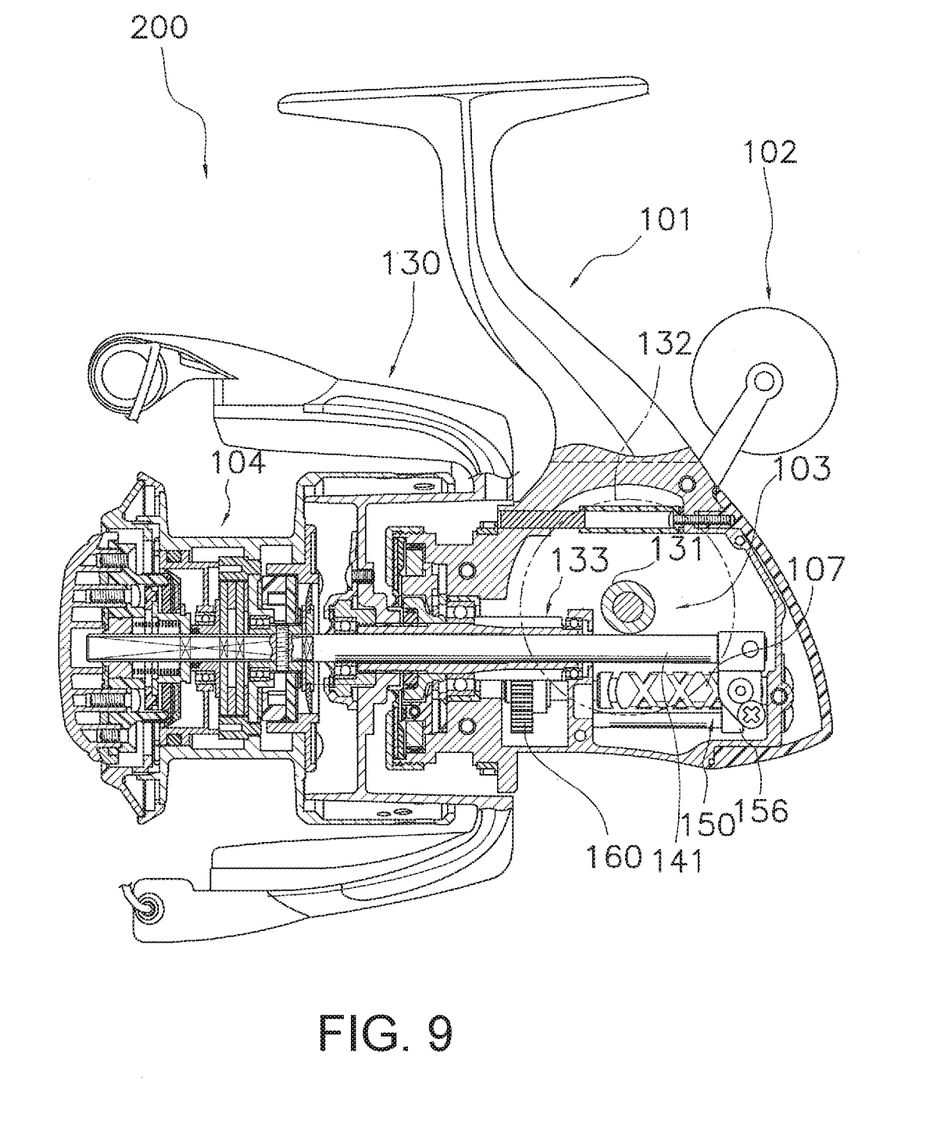
FIG. 9 is a lateral cross-sectional view of a spinning reel, which is a fishing reel according to a second embodiment of the present invention.

The engagement pin and the reciprocating mechanism of the fishing reel according to the first embodiment of the present invention will be described below, with reference to the drawings. In the first embodiment, the fishing reel is a dual-bearing reel 100. In the following description, "front" indicates the direction in which the fishing line is unreeled (cast); specifically, up in FIG. 2 and left in FIG. 9 are the "front."

Schematic Structure of the Dual-Bearing Reel

Figure 1:
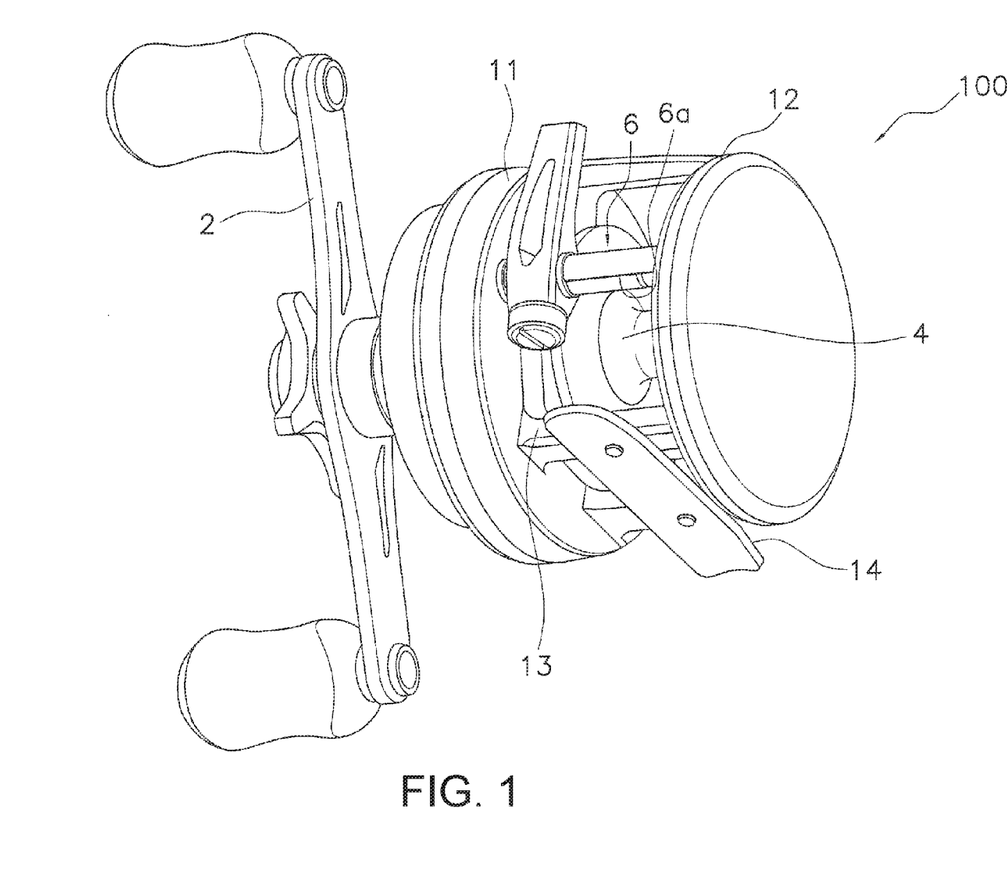
FIG. 1 is a perspective view of a dual-bearing reel, which is a fishing reel according to a first embodiment of the present invention.
Figure 2:
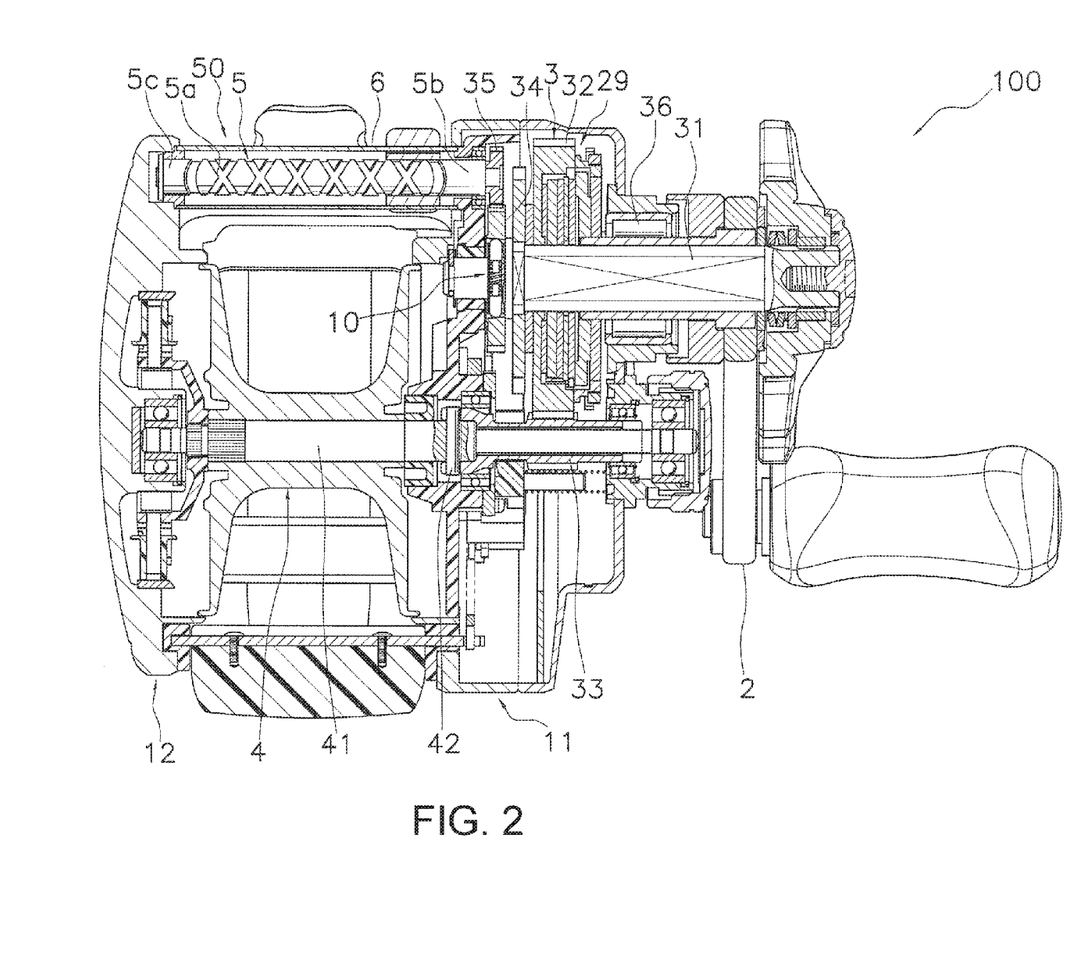
FIG. 2 is a plan cross-sectional view of the dual bearing reel.

As shown in FIG. 1 and FIG. 2, the dual-bearing reel 100 employing the first embodiment of the present invention casts a fishing line in a forward direction (the upper-left direction in FIG. 1). The dual-bearing reel 100 comprises a reel body 1 on which a handle 2 is rotatably disposed, a rotary drive mechanism 3, a spool 4, and a level winding mechanism 50 (one example of a reciprocating mechanism).

As shown in FIG. 1, the reel body 1 comprises a first side plate 11 a second side plate 12, a plurality of connecting portions 13, and a mounting portion 14. The first side plate 11 and the second side plate 12 are opposed to each other. As shown in FIG. 2, a spool shaft 41 is supported by the first side plate 11 and the second side plate 12.

As shown in FIG. 1, the connecting portions 13 connect the first side plate 11 and the second side plate 12. The mounting portion 14 extends in the longitudinal direction, and is configured to be mounted to a fishing rod. Of the connecting portions 13, at least one connecting portion 13 is fixed to the mounting portion 14.

As shown in FIG. 2, the handle 2 is rotatably mounted to the outside surface of the first side plate 11. The spool 4 and the level winding mechanism 50 are driven via the rotary drive mechanism 3, by rotating the handle 2.

The rotary drive mechanism 3 is a mechanism for transmitting the rotation of the handle 2 to the spool 4 and the level winding mechanism 50. The rotary drive mechanism 3 is installed in the first side plate 11. The rotary drive mechanism 3 comprises a drive shaft 31, a drive gear 32, a pinion gear 33, a first gear 34 and a second gear 35.

The drive shaft 31 is coupled to the handle 2, and integrally rotates with the handle 2. The rotation of the drive shaft 31 in the casting direction is prohibited by a one-way clutch 36. The drive gear 32 is rotatably mounted to the drive shaft 31 and integrally rotates with the drive shaft 31 via a drag mechanism 29. The pinion gear 33 meshes with the drive gear 32. Preferably, the pinion gear 33 has a tubular shape. The first gear 34 is mounted to the drive shaft 31 and integrally rotates with the drive shaft 31. The second gear 35 meshes with the first gear 34.

The spool 4 is disposed between the first side plate 11 and the second side plate 12. A fishing line is wound on the outer perimeter surface of the spool 4 by rotation of the handle 2. The spool 4 comprises an integrally rotatable spool shaft 41.

The spool shaft 41 is rotatably supported by the first side plate 11 and the second side plate 12 via an axle bearing member. The end of the spool shaft 41 on the first side plate 11 side extends through the pinion gear 33. The spool shaft 41 engages the pinion gear 33 via a clutch mechanism. When the clutch mechanism is in a clutch-on state, the spool shaft 41 and the pinion gear 33 engage each other and are integrally rotatable. Further, if the clutch mechanism is in a clutch-off state, the engagement between the spool shaft 41 and the pinion gear 33 is released, and they are relatively rotatable independently of each other. In particular, the pinion gear 33 engages the spool 41, and the engagement is released via an engagement pin 42 that extends through the spool shaft 41. The pinion gear 33 engages a clutch pin 42 when moving to the left side in FIG. 2, and the engagement with the clutch pin 42 is released when moving to the right side in FIG. 2.

Configuration of the Level Winding Mechanism

Figure 3:
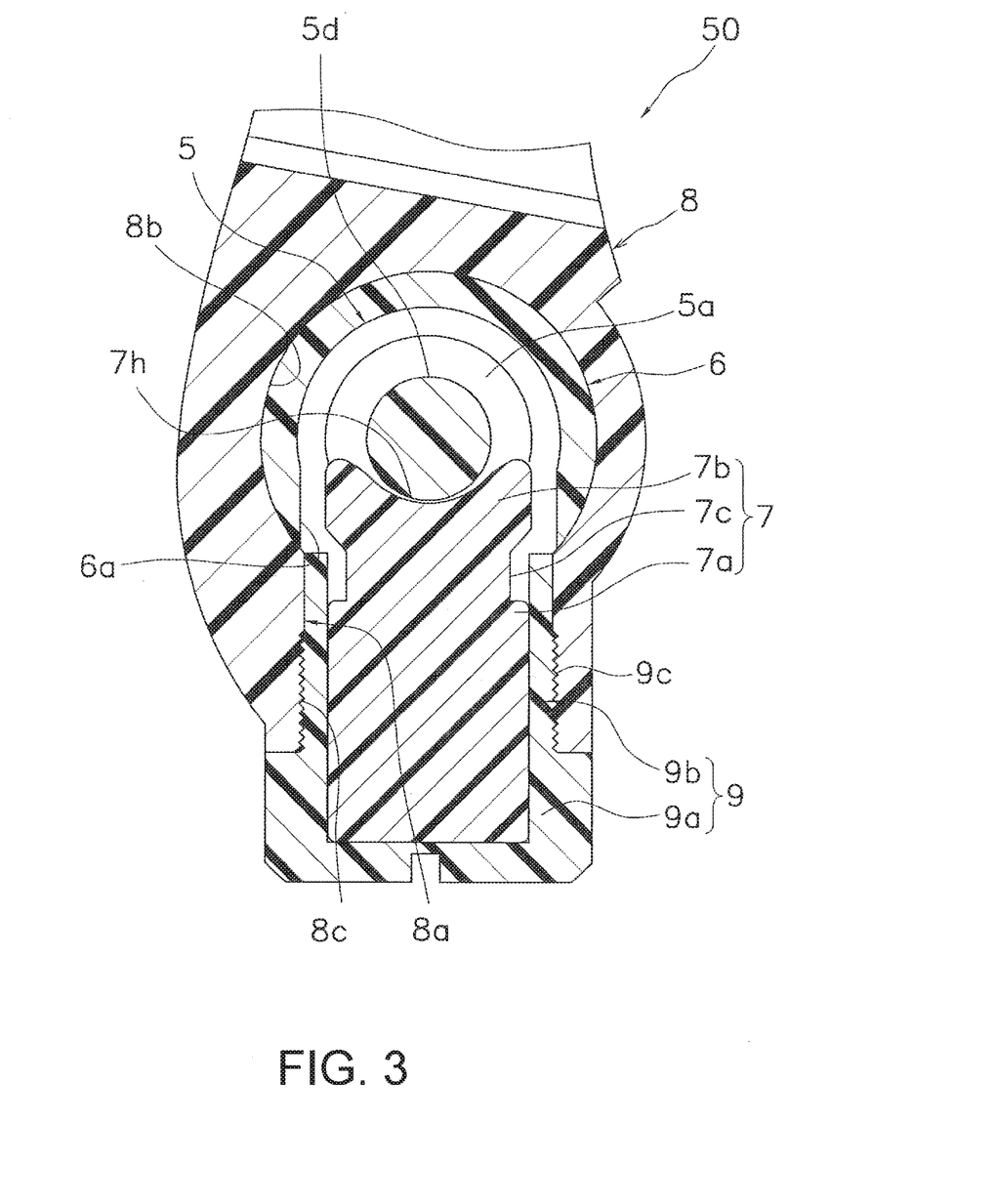
FIG. 3 is a cross-sectional view of a level winding mechanism.
Figure 4:
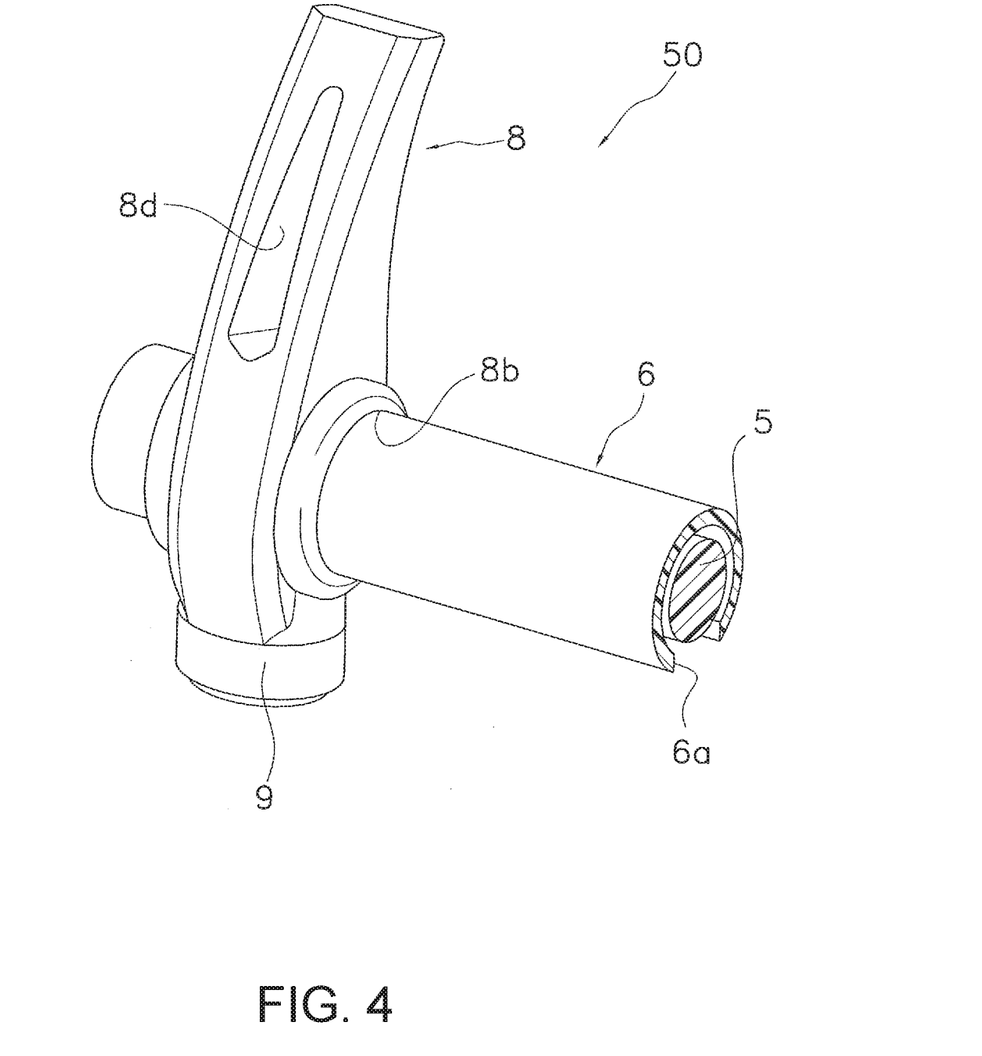
FIG. 4 is a perspective view of the level winding mechanism.

In FIG. 2, FIG. 3, and FIG. 4, the level winding mechanism 50 is a mechanism that reciprocates to evenly wind the fishing line on the spool 4. The level winding mechanism 50 comprises a worm shaft 5, a guide member 6, an engagement pin 7, a fishing line guide 8, a lid member 9, and a torque limiting mechanism 10.

Worm Shaft

As shown in FIG. 2, the worm shaft 5 is formed in a cylindrical shape and comprises intersecting spiral grooves 5a on the outer perimeter surface. The worm shaft 5 is disposed substantially parallel to the spool shaft 41. The worm shaft 5 extends between the first side plate 11 and the second side plate 12. At least a portion of the worm shaft is made of synthetic resin, such as polyacetal and polyamide resins. In the first embodiment, the entire worm shaft 5 is made of synthetic resin.

A first end portion 5b of the worm shaft 5 is rotatably supported to the first side plate 11. The first end portion 5b of the worm shaft 5 can be supported by the first side plate 11 via an axle bearing member. A second end portion 5c of the worm shaft 5 is rotatably supported by the second side plate 12. The second end portion 5c of the worm shaft 5 can be supported by the second side plate 12 via an axle bearing member.

The second gear 35 described above is mounted on the first end portion 5b of the worm shaft 5. The worm shaft 5 is integrally rotatable with the second gear 35. The worm shaft 5 rotates in conjunction with the rotation of the handle 2. In particular, when the handle 2 is rotated, the second gear 35 is rotated via the drive shaft 31 and the first gear 34; as a result, the worm shaft 5 is rotated.

Guide Member

The guide member 6 is a member for guiding the fishing line guide 8, into which a fishing line can be inserted. The guide member 6 is formed in a cylindrical shape, and is disposed on the outer perimeter side of the worm shaft 5. The guide member 6 extends substantially parallel to the worm shaft 5. Further, the guide member 6 extends between the first side plate 11 and the second side plate 12. A first end portion of the guide member 6 is non-rotatably supported to the first side plate 11. A second end portion of the guide member 6 is non-rotatably supported to the second side plate 12.

As shown in FIG. 1 and FIG. 3, the guide member 6 comprises a window portion 6a. The window portion 6a allows the engagement pin 7 to engage the spiral grooves 5a. The window portion 6a is formed along the longitudinal direction of the guide member 6. That is, the window portion 6a is formed along the worm shaft 5. The window portion 6a opens in a downward direction when using the dual-bearing reel 100.

Engagement Pin

Figure 5:
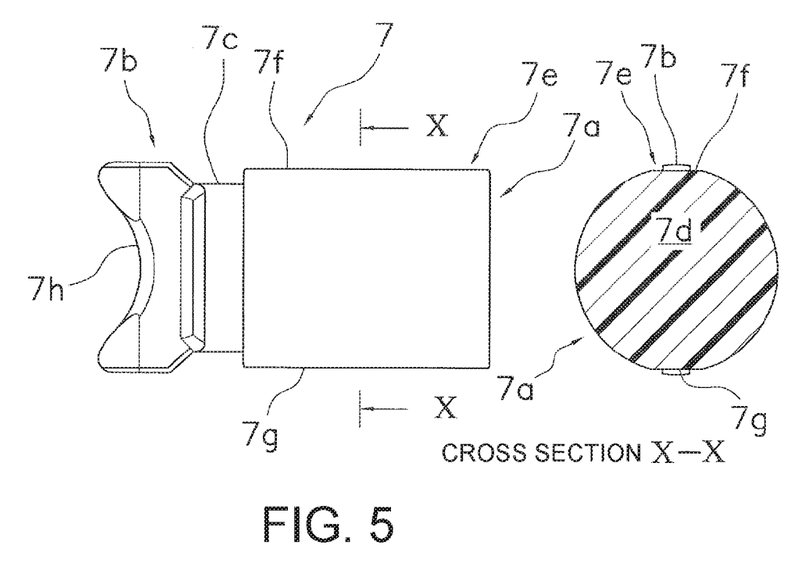
FIG. 5 is a side view and a cross-sectional view of the engagement pin.
Figure 6:
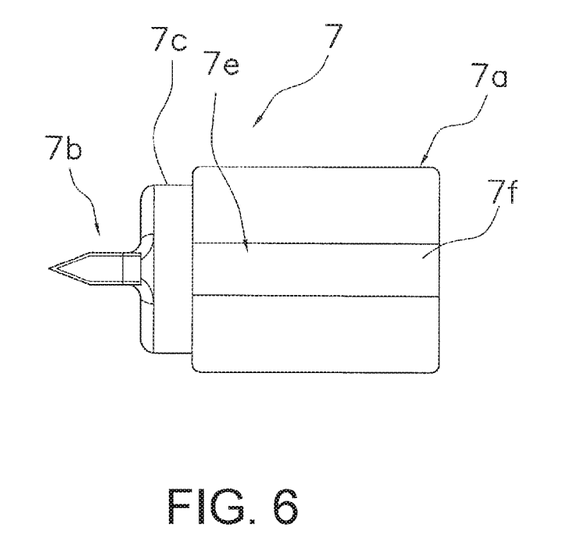
FIG. 6 is a plan view of the engagement pin.

As shown in FIG. 3, FIG. 5, and FIG. 6, the engagement pin 7 is configured to engage the spiral grooves 5a of the worm shaft 5. The engagement pin 7 extends from outside the guide member 6 to inside the guide member 6 via the window portion 6a. The engagement pin 7 comprises a shaft portion 7a, an engagement portion 7b, and a narrowed portion 7c. At least the engagement portion 7b of the engagement pin 7 is made of synthetic resin, such as polyacetal and polyamide resins. In the first embodiment, the entire engagement pin 7 including the shaft portion 7a is made of synthetic resin. As shown by the X-X cross section in FIG. 5, the cross section 7d of the shaft portion 7A which is perpendicular to the axial direction is non-circular. The cross section 7d comprises at least one flat portion 7e. The flat portion 7e comprises at least a first flat surface 7f that is disposed along the axial direction. In the first embodiment, the flat portion 7e comprises a first flat surface 7f, and a second flat surface 7g which is parallel to the first flat surface 7f.

When manufacturing an engagement pin 7 with a single split mold which is divided in the axial direction, a first flat surface 7f and a second flat surface 7g are disposed in the dividing portion of the mold. Thus, burrs are less likely to be generated in the dividing portion of the mold, and, even if generated, the burrs are less likely to contact the inner perimeter surface of a pin mounting portion 9b of the lid member 9 described below. Accordingly, the level winding mechanism 50 is less likely to be affected by burrs.

The engagement portion 7b is integrally disposed one end of the shaft portion 7a. The engagement portion 7b is configured to engage the spiral grooves 5a. The shaft portion 7a and the engagement portion 7b are integrally formed. The engagement portion 7b becomes thinner in a direction away from one end of the shaft portion 7a, and comprises, at the distal end, an engagement recess 7h that engages with the bottom portion 5d of the spiral grooves 5a and which is recessed in an arcuate shape.

Fishing Line Guide

As shown in FIG. 3 and FIG. 4, the fishing line guide 8 slides along the worm shaft 5. In particular, the fishing line guide 8 is reciprocated along the worm shaft 5. The fishing line guide 8 is guided by the guide member 6. The fishing line guide 8 comprises a first through-hole 8a and a second through-hole 8b.

The first through-hole 8a is a hole for rotatably housing the shaft portion 7a of the engagement pin 7. The cross-section of the first through-hole 8a is formed in a circular shape. A female threaded portion 8c is formed in at least one portion of the inner perimeter surface of the first through-hole 8a. The first through-hole 8a communicates with the second through-hole 8b.

The second through-hole 8b extends along the worm shaft 5. The guide member 6 extends through the second through-hole 8b. The inner perimeter surface of the second through-hole 8b contacts the outer perimeter surface of the guide member 6. Thus, the fishing line guide 8 is guided by the guide member 6. The cross-section of the second through-hole 8b is formed in a circular shape.

The fishing line guide 8 comprises a fishing line guide portion 8d for guiding the fishing line. The fishing line extends forward from the spool 4 through the fishing line guide portion 8d. Meanwhile, the fishing line guide portion 8d is a hole that extends through the fishing line guide 8, and is formed in a vertically long shape.

Lid Member

As shown in FIG. 3, the lid member 9 comprises a lid side plate 9a and a pin mounting portion 9b. The lid side plate 9a is configured to cover one end of the first through-hole 8a. The pin mounting portion 9b is formed in a cylindrical shape, and extends from the lid side plate 9a. The pin mounting portion 9b is housed inside the first through-hole 8a. Further, the pin mounting portion 9b is disposed between the inner perimeter surface of the first through-hole 8a and the outer perimeter surface of the engagement pin 7. In particular, the pin mounting portion 9b is disposed between the inner perimeter surface of the first through-hole 8a and the outer perimeter surface of the shaft portion 7a. The pin mounting portion 9b rotatably houses the engagement pin 7.

The shaft portion 7a of the engagement pin 7 is housed in the pin mounting portion 9b. The inner diameter of the pin mounting portion 9b is designed to be about the same dimension as the outer diameter of the shaft portion 7a of the engagement pin 7. In particular, the outer diameter of the shaft portion 7a is smaller than the inner diameter of the pin mounting portion 9b to the degree that the shaft portion 7a of the engagement pin 7 is rotatable around the axis inside the pin mounting portion 9b.

A male threaded portion 9c is formed in at least one portion of the outer perimeter surface of the pin mounting portion 9b. This male threaded portion 9c is screwed to a female threaded portion 8c that is formed on the inner perimeter surface of the first through-hole 8a. That is, the pin mounting portion 9b is fixed to the fishing line guide 8, and holds the engagement pin 7. As can be seen from FIG. 3, the outside surface of the lid member 9 is smoothly continuous with the outside surface of the fishing line guide 8.

Torque Limiting Mechanism

Figure 7:
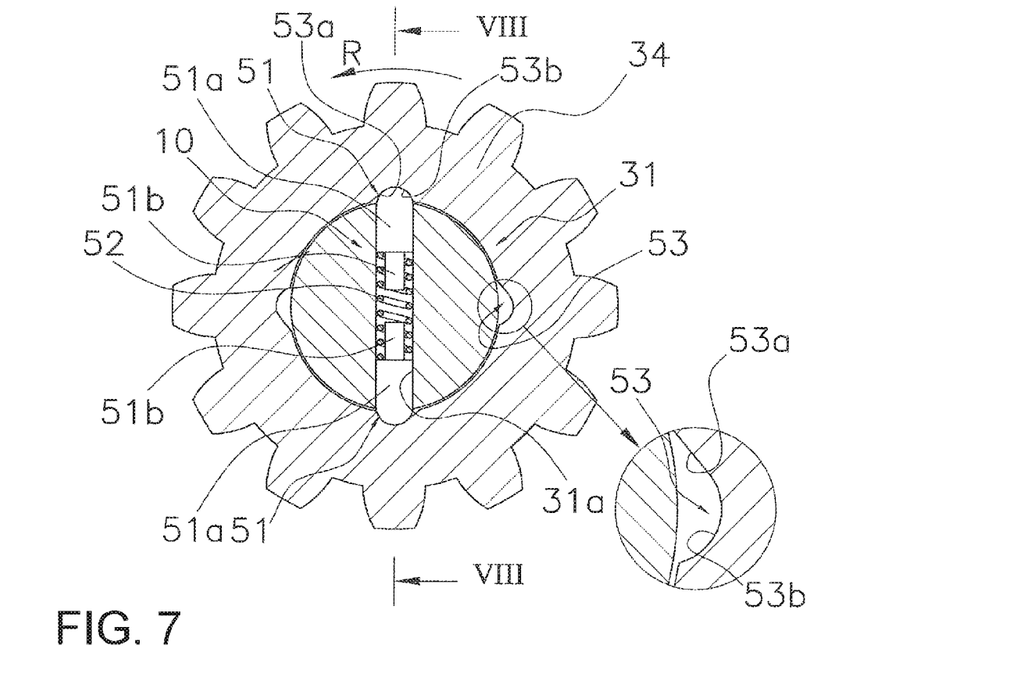
FIG. 7 is a cross-sectional view of a torque limiting mechanism.
Figure 8:
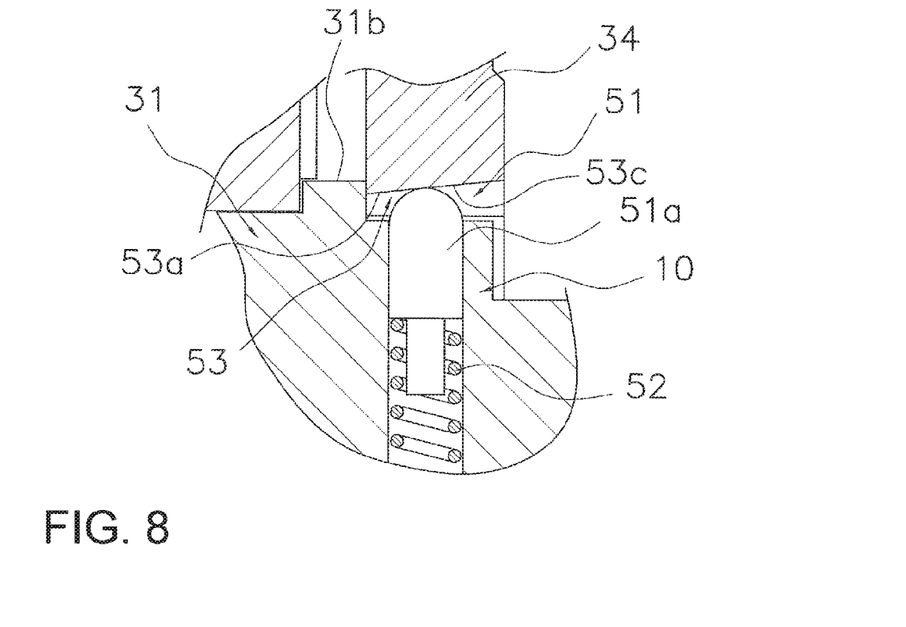
FIG. 8 is an enlarged cross-sectional view of the torque limiting mechanism.

As shown in FIG. 2, the torque limiting mechanism 10 is disposed between the rotary drive mechanism 3 and the worm shaft 5. The torque limiting mechanism 10 limits the rotational torque that is transmitted from the rotary drive mechanism 3 to the worm shaft 5. In other words, the torque limiting mechanism 10 limits the rotational drive force which rotates the worm shaft 5. In the present embodiment, the torque limiting mechanism 10 is disposed between the drive shaft 31 and the first gear 34. As shown in FIG. 7 and FIG. 8, the torque limiting mechanism 10 comprises a pair of pin members 51 and a biasing member 5 disposed on the drive shaft 31, and at least one locking recess 53 that is formed on the first gear 34. The biasing member 52 is, for example, a coil spring, which biases the pair of pin members 51 toward the first gear 34. The locking recess 53 is formed on the inner perimeter surface of the first gear 34. In this embodiment, four locking recesses 53 are disposed at intervals in the circumferential direction.

A through-hole 31a, to which the pin members 51 can be mounted freely movable back and forth, is formed on the drive shaft 31, extending through in the diameter direction. The pin member 51 comprises a head 51a having a hemispherical shell shaped curved surface, and a shaft portion 51b which is smaller in diameter than the head 51a. The pin member 51 is disposed in the through-hole 31a so that the head 51a is oriented toward the locking recess 53. The biasing member 52 is disposed on the outer perimeter sides of the shaft portions 51b of the pair of pin members 51, and is disposed in a compressed state between the pair of heads 51a. As shown enlarged in FIG. 7, the locking recess 53 comprises a linear slope 53a on the downstream side of the rotation direction of the first gear 34 in the line winding direction indicated by the arrow R, and comprises a cylindrical surface 53b on the upstream side of the rotation direction. Therefore, normally, the rotation of the drive shaft 31 is transmitted to the first gear 28 with the pin member 51 applying pressure to the slope 53a. Thus, if a foreign object is caught in the level winding mechanism 15, and the handle 2 is turned hard, applying excessive force on the first gear 28, the pin member 51 retracts into the through-hole 31a and the drive shaft 31 idles; therefore, the first gear 28 is less likely to be damaged. The contact surface (slope 53a and cylindrical surface 53b) of the locking recess 53 which contacts the head 51a comprises an inclined surface 53c that intersects the axis of the drive shaft 31, as shown in FIG. 8. The inclined surface 53c is inclined so as to gradually approach the axis of the drive shaft 31 toward the drive gear 32 side. When manufacturing the first gear 34 by molding, the inclined surface 53c can be configured using a draft taper of the mold. Thus, when the pin member 51 applies pressure to the first gear 34, a force that presses the first gear 34 is generated in the abutting portion 31b; therefore the first gear 34 is less likely to rattle during rotation.

Operation of the Level Winding Mechanism

Next, the operation of the level winding mechanism 50 configured as described above is explained.

If the handle 2 is rotated, the worm shaft 5 is rotated via the drive shaft 31, the first gear 34, and the second gear 35. The engagement pin 7 is reciprocated along the worm shaft 5 by the rotation of this worm shaft 5. The engagement pin 7 is rotatably held by the lid member 9 and the lid member 9 is fixed to the fishing line guide 8; therefore, the fishing line guide 8 is also reciprocated along the worm shaft 5 with the engagement pin 7. As a result, the fishing line which is guided by the fishing line guide portion 83 of the fishing line guide 8 is evenly wound on the spool 4.

Since the engagement portion 7b is made of synthetic resin, the shape of the engagement portion 7b can be accurately maintained, when the engagement portion 7b of this engagement pin 7 slides into the spiral grooves 5a of the worm shaft 5. Further, since the portion of the worm shaft 5 in which the spiral grooves 5a are formed is also made of synthetic resin, the distal end portion of the engagement portion 7b that engages with the spiral grooves 5a is less likely to be worn, and the shape of the engagement portion 7b can be more accurately maintained. Furthermore, since a torque limiting mechanism 10 is disposed between the rotary drive mechanism 3 and the worm shaft 5, the shearing force that acts on the engagement portion 7b can be limited, and longevity of the engagement pin 7 and the worm shaft can be achieved.

Second Embodiment

In the second embodiment, the fishing reel is a spinning reel 200, as shown in FIG. 9. The spinning reel 200 employing the second embodiment of the present invention unreels (casts) a fishing line in a forward direction. The spinning reel 200 comprises a reel body 101 having a handle 102 rotatably disposed therein, a rotary drive mechanism 103, a spool 104 having a spool shaft 141, a rotor 130, and an oscillating mechanism 150 (one example of a reciprocating mechanism).

Schematic Configuration of the Spinning Reel

The reel body 101 rotatably supports the handle 102 and the rotor 130. Further, the reel body 101 supports the spool 104 to be reciprocally movable back and forth. The handle 102 is rotatably supported around the axis in the lateral direction. The rotary drive mechanism 103 transmits the rotation of the handle 102 to the rotor 130 and the oscillating mechanism 150. The rotary drive mechanism 103 comprises a drive shaft 131 that is integrally and rotatably coupled to the handle 102, a drive gear 132, and a pinion gear 133. The drive gear 132 comprises gear teeth on a face thereof, and is integrally rotated around a lateral axis with the drive shaft 131. The pinion gear 133 is a tubular gear, which meshes with the drive gear 132. A spool shaft 141 extends through the inner perimeter part of the pinion gear 133. The rotor 130 is integrally and rotatably coupled to the pinion gear 133. The rotor 130 winds the fishing line onto the spool 104 by rotating around the spool 104.

The spool 104 is disposed to the front portion of the rotor 130. The fishing line is wound around the outer perimeter of the spool 104 by the rotor 130 as the spool moves back and forth with the spool shaft 141. The spool shaft 141 is disposed extending through the center of the pinion gear 133, and the spool 104 is coupled to the distal end thereof.

The spool shaft 141 is reciprocated back and forth inside the pinion gear 133 by an oscillating mechanism 150 that is coupled to the proximal end.

Configuration of the Oscillating Mechanism

Figure 10:
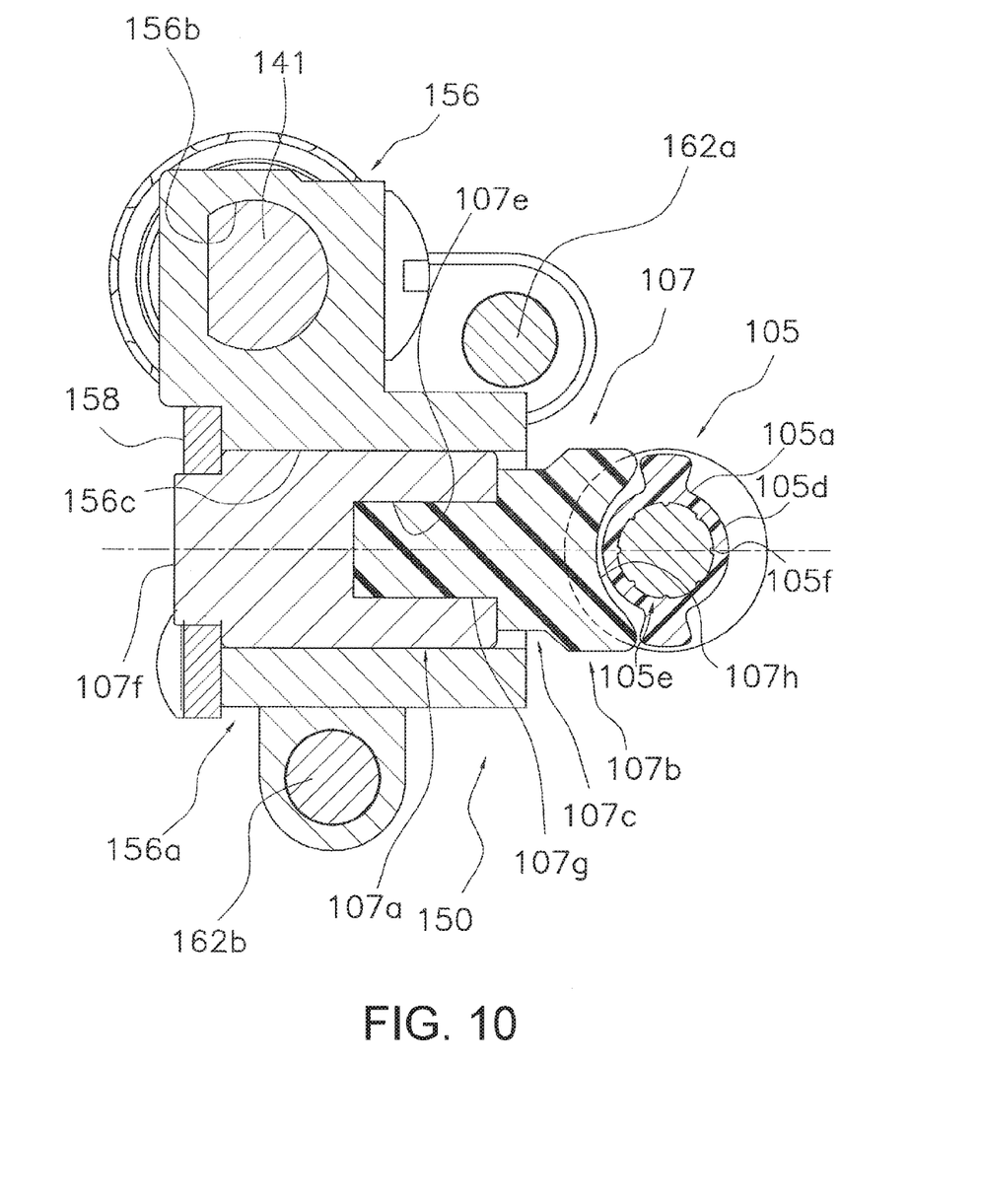
FIG. 10 is a cross-sectional view of an oscillating mechanism.
Figure 11:
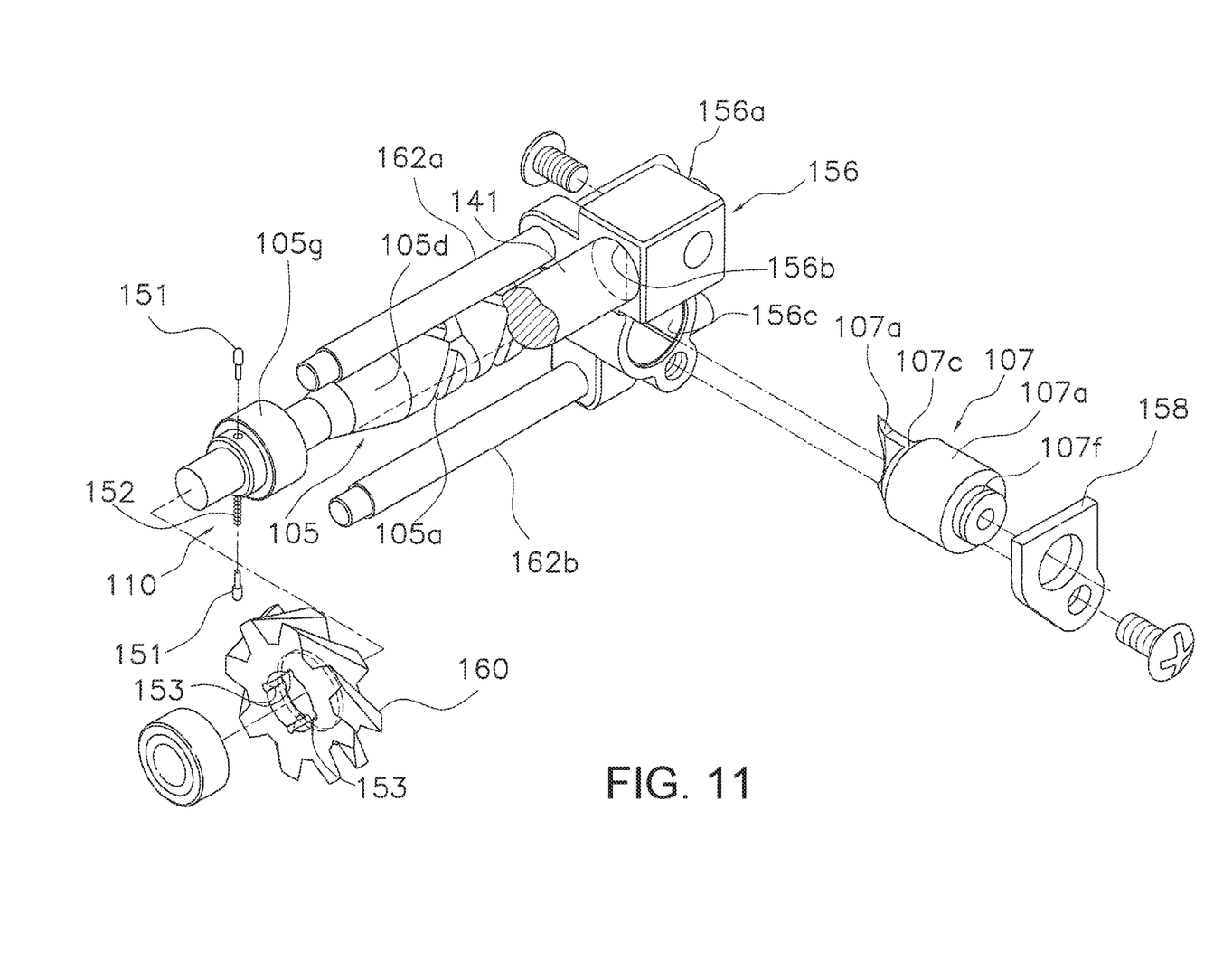
FIG. 11 is an exploded perspective view of the oscillating mechanism.

The oscillating mechanism 150 reciprocates the spool 104 in the longitudinal direction with the rotation of the handle 102, via the spool shaft 141. The oscillating mechanism 150 is disposed to evenly wind the fishing line to the spool 104. As shown in FIG. 10 and FIG. 11, the oscillating mechanism 150 comprises a worm shaft 105, an engagement pin 107, a slider 156, a torque limiting mechanism 110 (refer to FIG. 11), an intermediate gear 160, and a pair of guide shafts 162a, 162b. An engagement pin 107 is rotatably housed in the slider 156, as will be described below. (Refer to FIG. 10).

Worm Shaft

The worm shaft 105 is rotated in conjunction with a winding operation of the handle 102, which is mounted on the reel body 101. As shown in FIG. 10 and FIG. 11, the worm shaft 105 is disposed parallel to the spool shaft 141 below the spool shaft 141. The worm shaft 105 is disposed along the longitudinal direction. The two ends of the worm shaft 105 are rotatably supported to the reel body 101 via, for example, a rolling bearing. Further, the worm shaft 105 comprises intersecting spiral grooves 105a on the outer perimeter surface. In the second embodiment, at least a portion of the worm shaft 105 is made of synthetic resin. Here, as shown in FIG. 11, an outer side portion 105d of the worm shaft 105, in which the spiral grooves 105a are formed, is made of synthetic resin, such as polyacetal and polyamide resins. An inner side portion 105e is made of metal. At least one recess 105f is formed as a detent in the inner side portion 105e of the worm shaft 105, which is integrally formed by, for example, insert molding. In the present invention, a plurality (for example 2 to 16) of recesses 105f are provided. The portion of the inner side portion 105e in which the spiral grooves 105a at the distal end of the worm shaft 105 is not formed is exposed to the outside. A large diameter connecting portion 105g, to which is coupled an intermediate gear 160, is formed at the distal end of the inner side portion 105e.

Engagement Pin

As shown in FIG. 10, in the engagement pin 107 of the second embodiment, the shaft portion 107a is made of metal, but the engagement portion 107b and the narrowed portion 107c are made of synthetic resin. Therefore, the cross section of the shaft portion 107a is circular. A fitting recess 107e, which is fitted to the narrowed portion 107c, is formed at one end of the shaft portion 107a on the engagement portion 17b side. A circular projection 107f, which is fitted to a stopper member 158, is formed at the other end of the shaft portion 107a. A fitting protrusion 107g, which is fixed to the fitting recess 107e, is formed in the narrowed portion 107c. The fitting protrusion 107g may be fixed by bonding to the fitting recess 107e, or may be fixed by insert molding.

Slider

The slider 156 moves in the longitudinal direction along the worm shaft 105. As shown in FIG. 3, the slider 156 comprises a slider main body 156a that rotatably houses the engagement pin 107, and a stopper member 158 that retains the engagement pin 107. The slider main body 156a comprises a spool shaft connecting portion 156b, an engagement pin mounting portion 156c, and a pair of guide portions 156d.

The rear end portion of the spool shaft 141 is non-rotatably screwed to the spool shaft connecting portion 156b. The engagement pin 107 is rotatably mounted to the engagement pin mounting portion 156e. A pair of guide shafts 162a, 162b, which guide the slider main body 156a in the longitudinal direction, are fitted to the pair of guide portions 156d. The stopper member 158 is screwed to the slider main body 156a.

As shown in FIG. 10 and FIG. 11, the engagement pin mounting portion 156c is a substantially tubular portion. The shaft portion 107b of the engagement pin 107 is rotatably mounted to the engagement pin mounting portion 156c. When the engagement pin 107 is mounted to the engagement pin mounting portion 156c, the movement thereof is regulated in the axial direction.

Intermediate Gear

As shown in FIG. 11, the intermediate gear 160 is coupled to the distal end of the worm shaft 105 via a torque limiting mechanism 110. The intermediate gear 160 meshes with the pinion gear 133. The intermediate gear 23 is integrally and rotatably mounted to the front end of the worm shaft 105 by a non-circular engagement. The rotation of the handle 102 is transmitted to the intermediate gear 160 via the drive gear 132 and the pinion gear 133.

Torque Limiting Mechanism

As shown in FIG. 11, the torque limiting mechanism 110 limits the rotational torque that is transmitted from the rotary drive mechanism 103 to the worm shaft 105. In other words, the torque limiting mechanism 110 limits the rotational drive force which rotates the worm shaft 105. In the second embodiment, the torque limiting mechanism 110 is disposed between the intermediate gear 160 and the worm shaft 105. The torque limiting mechanism 110 basically has the same configuration as the torque limiting mechanism 10 of the dual-bearing reel 100 shown in FIG. 7 and FIG. 8. As shown in FIG. 11, the torque limiting mechanism 110 comprises a pair of pin members 151 and a biasing member 152 disposed in the connecting portion 105g of the worm shaft 105, and at least one locking recess 153 that is formed on the intermediate gear 160. The biasing member 152 is, for example, a coil spring, which biases the pair of pin members 151 toward the intermediate gear 160. The locking recess 153 is formed on the inner perimeter surface of the intermediate gear 160. In this embodiment, four locking recesses 153 are disposed at intervals in the circumferential direction. The locking recess 153 comprises the same inclined surface as in the first embodiment. The inclined surface is inclined so as to gradually approach the axis of the worm shaft 105 toward the spiral groove 105a side. Thus, when the pin member 151 applies pressure to the intermediate gear 160, a force that presses the intermediate gear 160 is generated on the inclined surface toward the spiral grooves 105a; therefore the intermediate gear 160 is less likely to rattle during rotation. The configuration of the torque limiting mechanism 110 is the same as the first embodiment, and the description thereof is omitted.

Operation of the Oscillating Mechanism

Next, the operation of the oscillating mechanism 150 configured in the way described above will be explained.

If the handle 102 is rotated, the worm shaft 105 is rotated via the drive shaft 131, the pinion gear 133, and the intermediate gear 160. The engagement pin 107 is reciprocated along the worm shaft 105 by the rotation of this worm shaft 105. The engagement pin 107 is rotatably held by the slider 156, and the slider 156 is fixed to the spool shaft 141; therefore, the spool 104 is reciprocated along the worm shaft 105 with the engagement pin 107. As a result, the spool 104 is reciprocated back and forth with respect to the rotor 130, and the fishing line which is guided by the spool 104 is evenly wound on the spool 104.

Since the engagement portion 107b is made of synthetic resin, the shape of the engagement portion 107b can be accurately maintained, when the engagement portion 107b of this engagement pin 107 slides into the spiral grooves 105a of the worm shaft 105. Further, since the portion of the worm shaft 105 in which the spiral grooves 105a are formed is also made of synthetic resin, the distal end portion of the engagement portion 107b that engages with the spiral grooves 105a is less likely to be worn, and the shape of the engagement portion 107b can be more accurately maintained. Further, since a torque limiting mechanism 110 is disposed between the worm shaft 105 and the intermediate gear 160, which is mounted to the worm shaft 105, the shearing force that acts on the engagement portion 107b can be limited, and longevity of the engagement pin 107 and the worm shaft 105 can be achieved. Further, it is possible to weaken the rotational drive force that is transmitted to the worm shaft 105, the outer side portion 105d of which uses synthetic resin with a rigidity that is lower than metal, by the torque limiting mechanism 110. Accordingly, malfunction will not occur in the oscillating mechanism 150, which is a reciprocating mechanism, even when using a synthetic resin worm shaft 105.

The embodiment described above can be expressed as the following.

(A) A level winding mechanism 50 (or oscillating mechanism 150) of a dual-bearing reel 100 (or a spinning reel 200) is equipped with a worm shaft 5 (or 105) comprising intersecting spiral grooves 5a (or 105a), and an engagement pin 7 (or 107), and a torque limiting mechanism 10 (or 110). The engagement pin 7 (or 107) engages with the spiral grooves 5a (or 105a). The torque limiting mechanism 10 (or 110) limits the rotational drive force which rotates the worm shaft 5 (or 105). At least a portion of the worm shaft 5 (or 105) is made of synthetic resin.

In this level winding mechanism 50 (or oscillating mechanism 150), the rotational drive force that rotates the worm shaft 5 (or 105), at least a portion of which is made of synthetic resin, is limited by the torque limiting mechanism 10 (or 110). Accordingly, it is possible to weaken the rotational drive force that is transmitted to the worm shaft 5 (or 105), at least a portion of which uses synthetic resin with a rigidity that is lower than metal. Accordingly, malfunction will not occur in the level winding mechanism 50 (or oscillating mechanism 150), even when using a synthetic resin worm shaft 5 (or 105).

(B) The engagement pin 7 (or 107) comprises an engaging portion 7b (or 107b) and a shaft portion 7a (or 107a). The engagement portion 7b (or 107b) is integrally disposed on one end of the shaft portion 7a (or 107a), and engages the spiral grooves 5a (or 105a) of the worm shaft 5 (or 105). At least the engagement portion 7b (or 107b) is made of synthetic resin. In this embodiment, the engagement portion 7b (or 107b) that engages the spiral grooves 5a (or 105a) is made of synthetic resin. The shape of the engagement portion 7b (or 107b) of the engagement pin 7 (or 107) of the level winding mechanism 50 (or oscillating mechanism 150) can be accurately maintained by injection molding. Further, abrasion and wear, etc., of the spiral groove 5a (or 105a) can be suppressed to a minimum.

(C) The shaft portion 7a (or 107a) and the engagement portion 7b (107b) are made of synthetic resin and are integrally formed. In this embodiment, manufacturing the engagement pin 7 (or 107) is relatively easy. Further, it is possible to increase the rotating performance of the engagement pin 7 (or 107) around the shaft, by using a synthetic resin with high sliding performance.

(D) The engagement pin 7 (or 107) may further comprise a narrowed portion 7c (or 107c) with a smaller diameter than the shaft portion 7a (or 107a), which is disposed between the shaft portion 7a (or 107a) and the engagement portion 7b (or 107b). In this embodiment, the axial position of the engagement pin 7 (or 107) in a direction that approaches the worm shaft 5 (or 105) can be positioned by the level difference between the shaft portion 7a 107a) and the narrowed portion 7c (or 107c). Accordingly, it is easy to maintain a constant gap between the distal end of the engagement portion 7b (or 107b) and the bottom portion of the spiral grooves 5a (or 105a).

(E) The engagement portion 7b (or 107b) thins in a direction away from one end, and comprises, at the distal end, an engagement recess 7h (or 107h) that engages with the bottom portion of the spiral grooves 5a (or 105a) and which is recessed in an arcuate shape. In this embodiment, it is possible to smoothly move the engagement pin 7 (or 107) while maintaining the gap between the engagement recess 7h (or 107h) and the bottom portion constant.

(F) The shaft portion 7a is non-circular. In this embodiment, since the cross section 7d of the shaft portion 7a that is perpendicular to the axial direction of the shaft portion 7a is non-circular, a gap can be formed between the engagement pin 7, which is disposed in a circular hole, and the mounting portion of the engagement pin 7. Accordingly, when forming engagement pin 7 with a single split mold that is divided along the axial direction, by arranging the cleavage planes of the two molds in the portion where the gap is formed, even if burrs are generated, the accuracy of the engagement pin 7, which is disposed in the circular hole, will not be significantly affected.

(G) The cross section 7d of the shaft portion 7a that is perpendicular to the axial direction of the shaft portion 7a comprises at least one flat portion 7e. In this embodiment, since a fiat portion 7e is a relatively simple shape, it is easy to form a portion in the dividing portion of the mold which becomes the flat portion 7e.

(H) The shaft portion 7a comprises a first flat surface 7f that is disposed along the axial direction. In this embodiment, since a first flat surface 7f is an even simpler shape, it is easy to form a portion in the dividing portion of the mold which becomes the first flat surface 7f.

The shaft portion 7a may further comprise a second flat surface 7g that is parallel to the fink flat surface 7f. In this embodiment, by disposing portions that become the first flat surface 7f and the second flat surface 7g in the dividing portion of the mold, when manufacturing an engagement pin 7, the engagement pin is less likely to be affected by burrs that can be generated in the dividing portion.

The dual-bearing reel 100 (or spinning reel 200) comprises a reel body 1 (or 101) having a handle 2 (or 102) rotatably disposed thereon, a spool 4 (or 104) to which a fishing line is wound by a rotation of the handle 2 (or 102), and the above-described reciprocating mechanism 50 (or oscillating mechanism 150) for evenly winding the fishing line on to the spool 4 (or 104).

In this dual-bearing reel 100 (or spinning reel 200), when the worm shaft 5 (or 105) is rotated by a rotation of the handle 2 (or 102), the engagement pin 7 (or 107) that is engages the spiral grooves 5a (or 105a) is reciprocated along the axial direction of the worm shaft 5 (or 105). The above-described action and effect are exerted, because at least a portion of the worm shaft 5 (or 105) is made of synthetic resin.

The fishing reel is a dual-bearing reel 100. The reel body 1 may also comprise a first side plate 11 and a second side plate 12. The spool 4 may comprise a spool shaft 41 that is rotatably supported by the first side plate 11 and the second side plate 12, and be rotatably disposed between the first side plate 11 and the second side plate 12. The worm shaft 5 can be disposed parallel to the spool shaft 41 and rotatably supported by the first side plate 11 and the second side plate 12. The level winding mechanism 50 can comprise a fishing line guide 8 that is supported by the reel body 1 so as to be movable in the axial direction parallel to the spool shaft 41, and which rotatably houses the engagement pin 7 inside. The fishing line guide 8 can be reciprocated in the axial direction of the spool shaft 41 between the first side plate 11 and the second side plate 12 by a rotation of the worm shaft 5. In this embodiment, the above-described action and effects are exerted in the dual-bearing reel 100.

The fishing reel is a spinning reel 200. The spinning reel 200 may comprise a rotor 130 that is rotated with respect to the reel body 101 by a rotation of the handle 102, and that rotates around the spool 104 to wind the fishing line onto the spool 104. The oscillating mechanism 150 can comprise a slider 156, to which a spool shaft 141 is coupled so as to be axially immovable, supported by the reel body 101 so as to be movable in the axial direction of the spool shaft 141, and in which an engagement pin 107 is rotatably housed. The slider 156 is reciprocated in the axial direction of the spool shaft 141 by the rotation of the worm shaft 105. In this embodiment, the above-described action and effects are exerted in the spinning reel 200.

Other Embodiments

One embodiment of the present invention is described above, but the present invention is not limited to the above-described embodiment, and various modifications can be made without departing from the scope of the invention. Especially, the various embodiments and modified examples described in the present Specification can be freely combined according to necessity.

(a) In the above-described embodiment, an engagement pin 7 which is entirely made of synthetic resin, an engagement pin 107 in which the worm shaft 5 and at least the engagement portion 17b are made of synthetic resin, and a worm shaft 105 which is partially made of synthetic resin are disclosed, but the present invention is not limited thereto. The entire engagement pin 7 (or 107) made be made of metal as well.

(b) In the above-described embodiment, the present invention is described using a dual-bearing reel 100 and a level winding mechanism 50, as well as a spinning reel 100 and an oscillating mechanism 150 as examples; however, the present invention may also be applied to other fishing reels such as an electric reel, etc., as well as to a reciprocating mechanism of other fishing reels.

(c) In the first embodiment, the present invention is described using a level winding mechanism 50, which is operated only by a rotation in the line winding direction of the handle 2 in a dual-bearing reel 100; however, the present invention is not limited thereto. The present invention may be applied to a level winding mechanism that is operated in conjunction with the rotation of the spool. In this embodiment, the torque limiting mechanism may be disposed between the spool and the worm shaft.

What is claimed is:

1. A reciprocating mechanism of a fishing reel, comprising:
   a worm shaft having intersecting spiral grooves;
   an engagement pin configured to engage the spiral grooves; and
   a torque limiting mechanism configured to limit a rotational drive force which rotates the worm shaft,
   at least a portion of the worm shaft being made of synthetic resin.

2. The reciprocating mechanism of the fishing reel recited in claim 1, wherein
   the engagement pin comprises
   a shaft portion, and
   an engagement portion integrally disposed on one end of the shaft portion and configured to engage the spiral grooves of the worm shaft,
   at least the engagement portion being made of synthetic resin.

3. The reciprocating mechanism of the fishing reel recited in claim 2, wherein the shaft portion and the engagement portion are integrally formed of synthetic resin.

4. The reciprocating mechanism of the fishing reel recited in claim 2, wherein
   the engagement pin comprises a narrowed portion disposed between the shaft portion and the engagement portion, the narrowed portion having a diameter that is smaller than a diameter of the shaft portion.

5. The reciprocating mechanism of the fishing reel recited in claim 2, wherein
   the engagement portion thins in a direction away from the one end of the shaft portion, and comprises, at a distal end, an engagement recess configured to engage a bottom portion of the spiral grooves and being recessed in an arcuate shape.

6. The reciprocating mechanism of the fishing reel recited in claim 2, wherein
   the shaft portion is non-circular when viewed in cross section perpendicular to an axial direction of the shaft portion.

7. The reciprocating mechanism of the fishing reel recited in claim 6, wherein
   the shaft portion comprises at least one flat portion when viewed in the cross section perpendicular to the axial direction of the shaft portion.

8. The reciprocating mechanism of the fishing reel recited in claim 2, wherein
   the shaft portion comprises a first flat surface disposed along an axial direction of the shaft portion.

9. The reciprocating mechanism of the fishing reel recited in claim 8, wherein
   the shaft portion further comprises a second flat surface that is parallel to the first flat surface.

10. A fishing reel, comprising:
    a reel body;
    a handle rotatably disposed on the reel body;
    a spool configured to have a fishing line wound thereon by rotation of the handle; and
    a reciprocating mechanism configured to evenly wind the fishing line on to the spool, the reciprocating mechanism having
    a worm shaft having intersecting spiral grooves,
    an engagement pin configured to engage the spiral grooves, and
    a torque limiting mechanism configured to limit a rotational drive force which rotates the worm shaft,
    at least a portion of the worm shaft being made of synthetic resin.

11. The fishing reel recited in claim 10, wherein
    the fishing reel is a dual-bearing reel,
    the reel body comprises
    a first side plate and a second side plate,
    the spool comprises a spool shaft rotatably disposed between and supported by the first side plate and the second side plate,
    the worm shaft is disposed parallel to the spool shaft and rotatably supported by the first side plate and the second side plate, the reciprocating mechanism further comprises
a fishing line guide supported by the reel so as to be movable in an axial direction parallel to the spool shaft, and
rotatably houses the engagement pin inside, and
the fishing line guide is configured to be reciprocated in the axial direction of the spool shaft between the first side plate and the second side plate by a rotation of the worm shaft.

12. The fishing reel recited in claim 10, wherein
the fishing reel is a spinning reel comprising
a rotor configured to be rotated with respect to the reel body by a rotation of the handle, and configured to rotate around the spool to wind the fishing line onto the spool,
the reciprocating mechanism further comprises
a slider, to which a spool shaft is coupled so as to be axially immovable, supported by the reel body so as to be movable in an axial direction of the spool shaft, and
rotatably houses the engagement pin, and
the slider is configured to be reciprocated in the axial direction of the spool shaft by a rotation of the worm shaft.

* * * * *